Jan. 4, 1949.　　　　T. KASKOURAS　　　　2,458,002
LOCK
Filed Oct. 17, 1945　　　　　　　　　　2 Sheets-Sheet 1
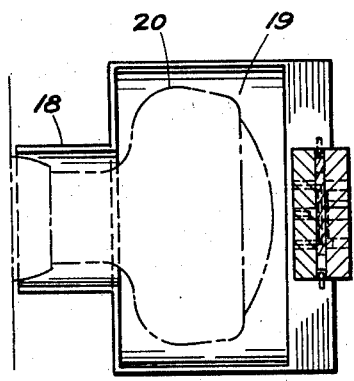
Fig. 1
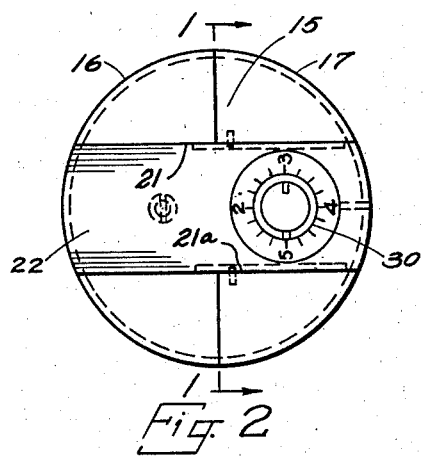
Fig. 2
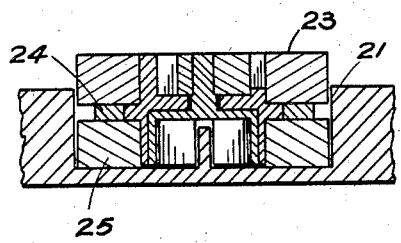
Fig. 3
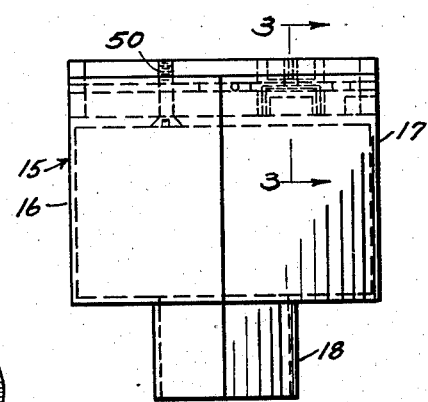
Fig. 4
Fig. 4a
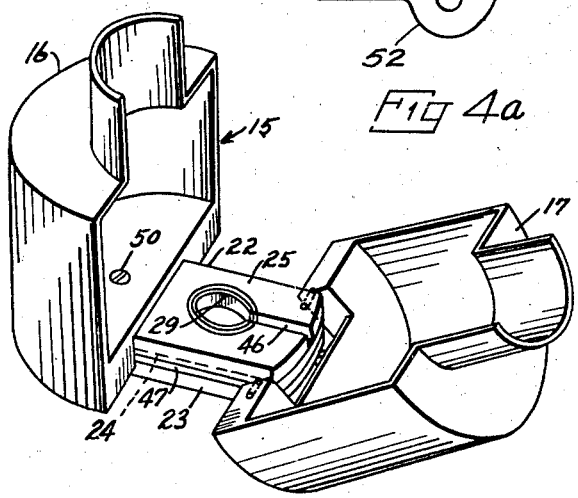
Fig. 5
INVENTOR
Thomas Kaskouras
BY Joshua R H Potts
atty Jan. 4, 1949. T. KASKOURAS 2,458,002
LOCK
Filed Oct. 17, 1945 2 Sheets-Sheet 2

INVENTOR
Thomas Kaskouras
BY Joshua R H Potts
Atty

Patented Jan. 4, 1949

2,458,002

UNITED STATES PATENT OFFICE 2,458,002

LOCK

Thomas Kaskouras, Chicago, Ill.

Application October 17, 1945, Serial No. 622,905

6 Claims. (Cl. 70—211)

This invention relates to safety devices, to-wit: Locks, which may be placed upon knobs to prevent the knobs from turning, etc.

I have shown a device, which may be locked by a combination lock, and which is large enough to cover the knob of the door, so that the knob cannot be grasped, and also, there are no screws or other means on the covering device whereby the covering device can be removed.

Another object is the provision of such a device as will be simple to operate and relatively inexpensive to produce.

Other objects and advantages will appear and be brought out more fully in the following specification, reference being had to the accompanying drawings, in which:

Fig. 1 is a vertical view of the lock, with the knob shown in dotted lines.

Fig. 2 is a front view of the same.

Fig. 3 is a vertical section taken on the line 3—3 of Fig. 4.

Fig. 4 is a side elevation with parts dotted in.

Fig. 4a is a plan view of a key suitable for use with the lock mechanism.

Fig. 5 is a perspective of the device, shown open and adapted to be placed around a knob.

Figure 6:
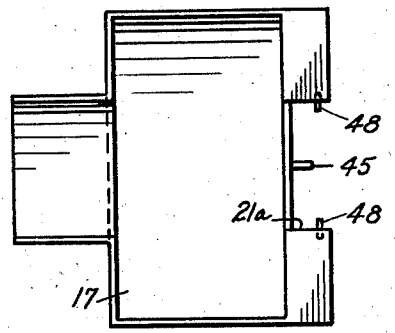
Fig. 6 is a view looking into one of the sections, the combination lock, etc., being removed.
Figure 6A:
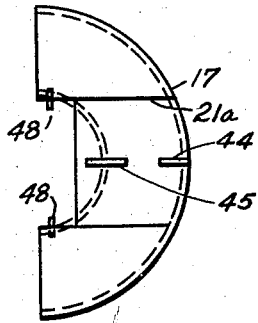
Fig. 6a is an end view of the section seen in Fig. 6, as seen from the right-hand side thereof.

Referring now to the drawings, in which I have selected for illustration the preferred form of my invention, I have shown a lock 15, having a left segment 16 and a right segment 17, as the drawings are viewed.

Attached to each of these segments is a neck portion 18, so that the entire device is adapted to cover the knob and its handle, as shown in Fig. 1, with the two segments to be locked by a combination lock, as will later appear.

When the two segments are put together, they form a chamber 19 for the knob.

Figure 7:
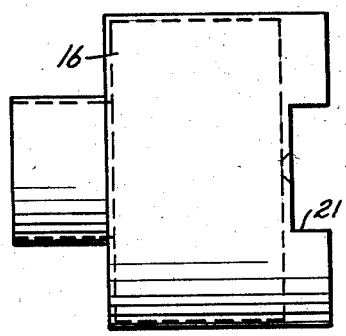
Fig. 7 is a view of the opposite half section to that shown in Fig. 6.
Figure 7A:
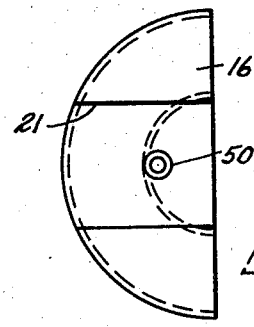
Fig. 7a is an end or edge view of the section seen in Fig. 7 as seen from the right-hand side thereof.
Figures 8, 8A:
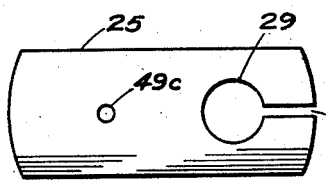
Fig. 8 shows a plan view of the bottom plate.
Fig. 8a is an end or edge view of the bottom plate shown in Fig. 8, as seen from the right-hand side thereof.

Each of the sections 16, 17 has a cut-out 21, 21a respectively as best illustrated in Figs. 6 and 7, to accommodate the auxiliary or combination locking means, etc.

I have shown a sliding keeper 22, consisting of upper plate 23 and an intermediate plate 24, and a lower plate 25, located in or adjacent to said cut-out 21, all as clearly shown in Figs. 3, 8, 9, and 10.

The upper plate 23 is provided with graduations 26, as shown in Fig. 2, and an opening 27.

The intermediate plate 24 also has an opening 28, registering with the opening 27, and the lower plate 25 has an opening 29, registering with the other two openings.

The opening 28 in the intermediate plate 24 is slightly larger than the openings 27 and 29, in the upper plate 23, and the lower plate 25, respectively.

Figures 11, 11A:
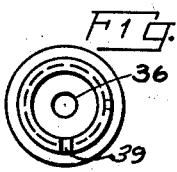
Fig. 11 is a side elevational view of the combination barrel.
Fig. 11a is an end view of the combination barrel seen in Fig. 11, as seen from the right-hand side thereof.
Figures 12, 12A, 13, 13A:
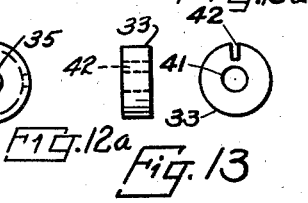
Fig. 12 is a side elevational view of the locking sleeve.
Fig. 12a is an end view of the sleeve shown in Fig. 12, as seen from the right-hand side thereof.
Fig. 13 is a side elevational view of the locking nut.
Fig. 13a is an end elevational view of the element shown in Fig. 13, as seen from the right-hand side thereof.

Adapted to be received in the openings 27, 28 and 29, is a combination lock 30, comprising a barrel 31, as shown in Fig. 11, and a locking sleeve 32, shown in Fig. 12, and a locking nut 33, shown in Fig. 13.

The locking sleeve 32 has a slot 34 and a shouldered, projecting shank 35.

The locking sleeve 32 is adapted to be received in a circular recess 37 provided in the lower, or left, side of the barrel 31, as the drawing is viewed in Fig. 11, with the shank 35 of the locking sleeve 32 projecting through the central opening 36 in the barrel 31.

The right-hand side of barrel 31 is also provided with a cut-out or circular recessed portion 38 and with a slot 39, as viewed in Fig. 11.

The left-hand side (Fig. 11) of the barrel also has a slot 40.

The nut 33 has a bore 41, adapted to receive the shank 35 in a tight-pressed fit, so as to hold the three parts together, to-wit: The barrel 31, locking sleeve 32 and nut 33.

The nut 33 is adapted to be received in the recess 38, and the nut 33 has also a slot 42.

The under or left side of the barrel 31 is adapted to fit into the opening 27 of the upper plate 23.

The barrel 31 may have an integral stop collar 43, against which the top plate 23 is adapted to abut.

The barrel, with its stop collar 43, just registers with the larger opening 28 of the intermediate plate 24, and is located therein.

The barrel is also located in the opening 29 of the bottom plate 25, and all three of the plates, 23, 24 and 25, are nested in the cut-outs 21 and 21a, as shown in Fig. 3.

Figures 9, 9A:
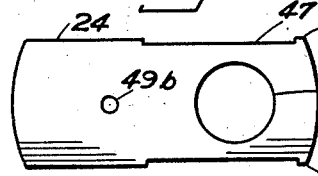
Fig. 9 is a plan view of the intermediate plate.
Fig. 9a is an end or edge view of the plate shown in Fig. 9, as seen from the right-hand side.

As shown in Fig. 6, one of the sections in the cut-out 21 has small fins 44 and large fins 45, adapted to fit in a slot 46 in the lower plate 25. The intermediate plate 24 also has cut-outs 47 at two opposite edges, as shown in Fig. 9, to accommodate pins 48, shown in Fig. 6.

The three plates, 23, 24 and 25, have apertures 49a, 49b and 49c, respectively.

Figures 10, 10A:
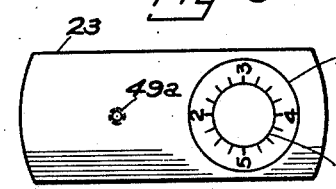
Fig. 10 is a plan view of the top plate.
Fig. 10a is an end or edge view of the plate shown in Fig. 10, as seen from the right-hand side.

Aperture 49a, shown in Fig. 10, is threaded, and all the apertures are adapted to receive a headed machine screw 50, to lock the parts together, as shown in Figs. 1, 2, 3, 4 and 5.

It will be understood that in order to insert the pins 48 between the upper and lower plates, and inside projections 51 on the plate 24, it will be necessary to lift either the top or bottom plate enough to slide the pins 48 in place.

Also shown is a key 52, which may be adapted to line up the slots 42 and 38 in varous ways with the graduations 26 on the top plate 23.

The slots may be cut at various points in the nut, the barrel and sleeve.

In the form shown, the key will line up the slots 38 and 42 at "5" and "3" in the graduations 26.

This will cause the slots 34 and 40 to line up to permit the plates 23, 24 and 25 to be pulled to the left in the section 17, as Fig. 2 is viewed, thereby permitting the section 17 to slide to the right so as to permit the two segments to be pulled apart, as shown in Fig. 5.

This is made possible by the fact that since the slots 34 and 40 are lined up with the fin 45, the fin will not obstruct the leftward movement of the plates, but will pass through the slots 34 and 40.

On the other hand, if the slots 34 and 40 had not been so lined up, then it would have been impossible to pull the barrel 31 and the locking sleeve 32 to the left, looking at Fig. 2, by means of the plates 23, 24 and 25.

Thus, in order to open the segments, it is necessary to line up the slots 38 and 42.

It is thought that the operation will be clear without further explanation, but, in brief, the two sections are separated to start with, as in Fig. 5, and then placed over the knob, and the right-hand section, looking at Fig. 5, is moved to the left, looking at Fig. 5, with the pins sliding in the cut-out 47 of the intermediate plate. When the segments are brought together, the slots 38 and 42, which have been lined up, may be put out of line by the key, or other means, and then the fins will be obstructed by the barrel and the locking sleeve, and it will not be possible to open the lock.

Since the screw 50 is on the inside of the lock, it will be impossible to have access to the screw, and will, therefore, be impossible to open the lock or turn the knob. Therefore, it will be apparent that anyone who tries to open the lock will find it impossible becaue he will have no way of determining the combination, to-wit: The method of lining up the slots 34 and 40.

I claim:

1. In a device of the kind described and for use with a door knob, a casing operable to enclose said door knob and comprising a pair of sections, a member connecting said sections and having means slidably receiving coacting means fastened to the other of the sections, and means arranged on the member and effective to lock the pair of sections against relative movement.

2. In a device of the kind described and for use with a door knob, a casing operable to enclose said door knob and including a pair of relatively movable sections, means connecting said sections, slotted means arranged on said first-mentioned means and coactable with instrumentalities secured to one of the sections, and a lock in the first-mentioned means, said lock being effective to secure the pair of sections against relative movement.

3. In a device of the kind described and for use with a door knob, a casing operable to enclose said door knob, and including a pair of relatively movable sections, a sectional plate joining said sections, said plate being fastened to one of the sections and slidably connected to the other of the sections, and means including a lock arranged in the plate, said means being effective to prevent relative movement of one section relatively to the other.

4. In a device of the character described and for use with a door knob, a casing operable to enclose and optionally uncover said door knob, said casing including a pair of sections slidable one relatively to the other, means connecting said sections and having slots formed thereon, other means projecting from one of the sections and slidably engaged in said slots, and a combination lock operably mounted in the first-mentioned means and effective to prevent movement of said other means in said slots, whereby translational movement of one section relatively to the other section may be prevented when desired.

5. In a device of the character described and for use with a door knob, a casing operable to enclose said door knob and including a pair of relatively movable sections, means operably connecting the sections and including a combination lock, said means having a plurality of longitudinally extending slots arranged in spaced relation, and elements projecting from one of said sections and coactable with said slots and combination lock, whereby the pair of sections may be moved relatively to each other and locked in a position effective to prevent access to said door knob.

6. In a device of the kind described and for use with a door knob, a casing normally enclosing said knob but operable to give access to the knob when desired, said casing including a pair of sections translationally movable one relatively to the other, means immovably fastened to one of the sections and slidably connected to the other of the sections, and a lock arranged in said means and effective to prevent and optionally to permit relative sliding movement of the last-mentioned section to the first-mentioned section.

THOMAS KASKOURAS.

(References on following page)

REFERENCES CITED

The following references are of record in the file of this patent:

UNITED STATES PATENTS

| Number | Name | Date |
|---|---|---|
| 200,599 | Beachman | Feb. 26, 1878 |
| 274,346 | Laubenberger | Mar. 20, 1883 |
| 1,415,662 | Levy | May 9, 1922 |
| 2,169,438 | Sherman | Aug. 15, 1939 |

FOREIGN PATENTS

| Number | Country | Date |
|---|---|---|
| 361,686 | Great Britain | Nov. 26, 1931 |